US00RE35246E

United States Patent [19]

Narita

[11] E Patent Number: Re. 35,246

[45] Reissued Date of Patent: May 21, 1996

[54] LAYED PHOTOSENSITIVE MATERIAL AND ELECTROPHOTOGRAPHY COMPRISING SELENIUM, ARSENIC AND TELLURIUM

[75] Inventor: Mitsuru Narita, Matsumoto, Japan

[73] Assignee: Fuji Electric Co., Ltd., Kawasaki, Japan

[21] Appl. No.: 171,000

[22] Filed: Dec. 21, 1993

Related U.S. Patent Documents

Reissue of:

[64] Patent No.: 4,868,077
Issued: Sep. 19, 1989
Appl. No.: 192,471
Filed: May 10, 1988

U.S. Applications:

[63] Continuation of Ser. No. 830,471, Feb. 3, 1992, abandoned, which is a continuation of Ser. No. 571, 186, Aug. 21, 1990, abandoned.

[30] Foreign Application Priority Data

Jun. 18, 1987 [JP] Japan ..... 62-152255

[51] Int. Cl.[6] ..... G03G 5/082; G03G 5/14

[52] U.S. Cl. ..... 430/58; 430/85; 430/95; 430/86; 430/66

[58] Field of Search ..... 430/58, 85, 86, 430/66, 95

[56] References Cited

U.S. PATENT DOCUMENTS

| | | | |
|---|---|---|---|
| 3,467,548 | 9/1969 | Straughan | 430/128 |
| 4,277,551 | 7/1981 | Sonnonstine | 430/120 |
| 4,286,033 | 8/1981 | Neyhart | 430/58 |

FOREIGN PATENT DOCUMENTS

| | | |
|---|---|---|
| 1597882 | 9/1976 | Germany . |
| 1193348 | 5/1970 | United Kingdom . |

*Primary Examiner*—Christopher D. Rodee
*Attorney, Agent, or Firm*—Brumbaugh, Graves, Donohue & Raymond

[57] ABSTRACT

A photosensitive material for electrophotography is provided, which comprises in sequence an electroconductive substrate, a carrier transport layer composed of a selenium-arsenic alloy, a carrier generation layer composed of a selenium-tellurium alloy and a surface coating layer composed of a selenium-arsenic alloy. The present invention further relates to a photosensitive material having a carrier transport layer that is doped with iodine as well.

1 Claim, 1 Drawing Sheet

LAYED PHOTOSENSITIVE MATERIAL AND ELECTROPHOTOGRAPHY COMPRISING SELENIUM, ARSENIC AND TELLURIUM

Matter enclosed in heavy brackets [ ] appears in the original patent but forms no part of this reissue specification; matter printed in italics indicates the additions made by reissue.

*This application is a continuation of application Ser. No. 07/830,471, filed on Feb. 3, 1992 now abandoned, which in turn is a continuation of Reissue application Ser. No. 07/571, 186 filed on Aug. 21, 1990 now abandoned.*

BACKGROUND OF THE INVENTION

The present invention relates to photosensitive material for electrophotography having a surface coating layer on a function-separation type multi-layered photosensitive structure for use in printers, digital copiers, and the like.

Conventional photosensitive materials for electrophotography include selenium type, OPC type, and so forth, and among them, the selenium type is excellent with respect to resolution power, durability, electric properties and circumstantial resistance. However, the drawbacks of using selenium lie in that it has sensitivity only up to about 550 nm, except for crystalline selenium which is panchromatic. Further the surface of selenium photosensitive material crystallizes even at a slight temperature elevation which makes the material unusable. In light of the above, various elements have been added to the photosensitive material to overcome such drawbacks.

For example, tellurium has been used as an additive in photosensitive materials. Although the addition of tellurium can increase the spectral sensitivity as well contribute to the suppression of crystallization, if the photosensitive material is intended to be sensitive to semiconductor lasers (800 nm), the amount of tellurium required becomes excessive due to reduction in the residual potential and increase in fatigue. Consequently, a surface coating layer (OCL) is added for suppressing the electrical charges from the surface. However, most of the materials used in such a coating layer, such as pure Se, OPC and 4 wt % As-Se alloy, have extremely low hardness and are inferior in printing resistance.

In the case of adding arsenic to the coating layer in order to increase the spectral sensitivity, heat resistance and sensitivity are improved as the amount of arsenic is increased. However, since the effective sensitivity region is only up to 700 nm, a coating layer containing arsenic is not suitable for semiconductor laser light sources with wave lengths at 800 nm.

The object of the present invention is to provide a photosensitive material for electrophotography capable of overcoming the foregoing problems, having sensitivity at long wavelengths and also excellent heat stability and printing resistance.

SUMMARY OF THE INVENTION

In accordance with the present invention, a photosensitive material for electrophotography is provided, which comprises in sequence an electroconductive substrate, a carrier transport layer composed of a selenium-arsenic alloy, a carrier generation layer composed of a selenium-tellurium alloy and a surface coating layer composed of a selenium-arsenic alloy. The present invention further relates to a photosensitive material having a carrier transport layer that is doped with iodine as well.

The surface coating layer comprising a seleniumarsenic type alloy has increased hardness compared to a layer comprising only selenium. High printing resistance can therefore be obtained with a selenium-arsenic alloy layer. Furthermore, a carrier generation layer composed of a selenium-tellurium type alloy having a high tellurium concentration can be used, which increases the sensitivity of the carrier generation layer to the semiconductor layer. In addition, use of a selenium-arsenic type alloy in the carrier transport layer makes it possible to prevent cracking of the surface coating layer due to differences in the heat expansion coefficients of the surface coating layer, having a small heat expansion coefficient (e.g. $2\times10^{-5}K^{-1}$), and the carrier generation layer.

DETAILED DESCRIPTION OF THE INVENTION

Figure 1:
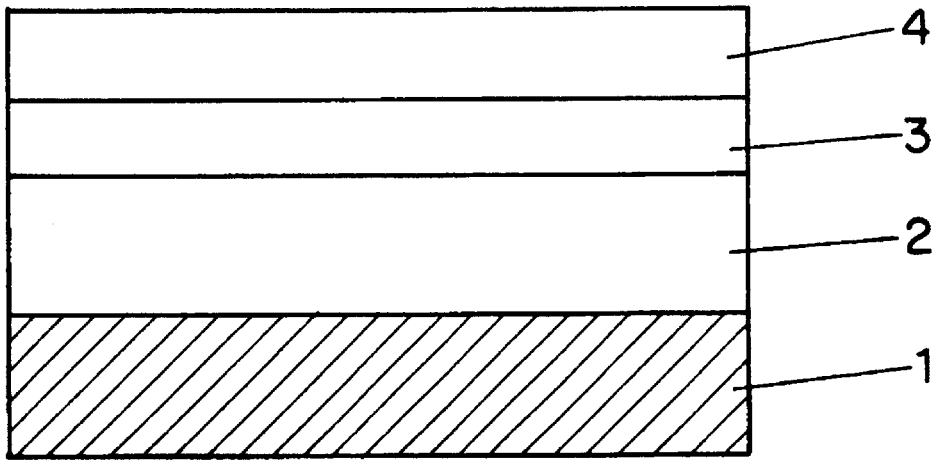
FIG. 1 is a cross sectional view illustrating the layer construction of one embodiment of the present invention.

The present invention relates to a photosensitive material for electrophotography, which comprises in sequence an electroconductive substrate, a carrier transport layer composed of a selenium-arsenic alloy, a carrier generation layer composed of a selenium-tellurium alloy and a surface coating layer composed of a selenium-arsenic alloy.

Referring to FIG. 1, the photosensitive material of one embodiment of the present invention comprises a carrier transport layer 2 composed of selenium-arsenic or selenium-arsenic-iodine alloy, a carrier generation layer 3 composed of selenium-tellurium alloy and a surface coating layer 4 composed of selenium-arsenic alloy laminated disposed in sequence on an electroconductive substrate 1 which is usually made of aluminum. Intermediate layers can be added selectively for the improvement of electrical characteristics between the substrate 1 and the carrier transport layer 2, between the carrier transport layer 2 and the carrier generation layer 3, or between the carrier generation layer 3 and the surface coating layer 4. Examples of such layers are described in commonly owned U.S. patent application Ser. No. 07/192,469 and Ser. No. 07/192,470 filed concurrently herewith which are incorporated herein by reference.

The preferred thickness of the surface coating layer 4 is from 0.5 to 10 μm. Although the layer should be as thin as possible to allow maximum incidental light to pass through the layer, the printing resistance of the layer must also be maintained. The concentration of arsenic in the surface coating layer 4 is preferably 5 to 40 atomic %. Greater than 40 atomic % arsenic ($As_2Se_3$) decreases the hardness of the layer, and less that 5 atomic % arsenic may involve decreases the printing resistance. At 5 atomic % arsenic the printing resistance of the surface coating layer 4 is maintained for about 300,000 sheets.

The preferred thickness of the carrier generation layer 3 is 0.05 to 5 μm. If it is less than 0.05 μm thick, high temperature stability of the photosensitive material decreases and the sensitivity is reduced at longer wavelengths. However, if the thickness of the carrier generation layer 3 exceeds 5 μm, dark decay increases. The composition of the carrier generation layer 3 is preferably from 5 to 40 atomic % tellurium. Greater than 40 atomic % tellurium causes an increase in dark decay and promotes crystallization of the layer.

The thickness of the carrier transport layer 2 is preferably from 30 to 80 μm in view of the surface potential or electric field. The arsenic concentration in the carrier transport layer 2 is preferably from 5 to 40 atomic % to maintain crystallization resistance and high temperature stability. If the arsenic concentration is increased to 40 atomic % in the surface coating layer 4 in order to increase the printing resistance, the arsenic concentration in the carrier transport layer 3 should be restricted to 30–40 atomic % arsenic to prevent cracking at high temperatures. However, if such photosensitive material is used for a high speed printer in which the time from exposure to development is approximately 100 μsec, since the running time in the film becomes more than 100 nsec, the effective sensitivity is reduced. In order to eliminate such a drawback, it is effective to dope the carrier transport layer 2 with iodine, thereby shortening the running time. If the amount of iodine exceeds 10,000 ppm, the dark decay is markedly increased and the surface charge density is decreased. If less than 100 ppm iodine is emplolyed, there is no substantial effect.

Each of the layers inevitably contains impurities that cannot be removed or need not be removed.

EXAMPLE 1

A photosensitive material for electrophotography was prepared in the following manner. First, an aluminum pipe of 242 mm diameter and 450 mm length was cleaned and fixed to a rotary support shaft of an evaporation device as the substrate, and maintained at a temperature of about 190° C. The evaporation device was evacuated down to a pressure of $1\times10^{-5}$ torr. Then, an evaporation source incorporating ($As_2Se_3$) alloy was heated to about 400° C. and a carrier transport layer was vapor deposited on the substrate having a film thickness of about 60 μm. Then, flash evaporation was used to vapor deposit Se/Te alloy of 34 atomic % Te as the carrier generation layer, so that the photosensitive material would have a spectral sensitivity at long wavelengths. The layer was vapor deposited to a thickness of about 0.5 μm while the temperature of the substrate axis was held at 60° C., the pressure in the evaporation device was held at $1\times10^{-5}$ torr and the temperature of evaporazation source was 350° C. An intermediate layer of about 0.4 μm thickness with a graduated Te concentration was disposed between the carrier generation layer and the carrier transport layer so that carriers generated in the carrier generation layer would be smoothly transferred to the carrier transport layer. Then, As/Se alloy of 38 atomic % arsenic was vapor deposited to a thickness of about 2 μm of the carrier generation layer. This formed the surface coating layer.

EXAMPLE 2

A photosensitive material was prepared in the same manner as Example 1, except that the carrier transport layer was doped with 5000 ppm of iodine.

EXAMPLE 3

A photosensitive material was prepared in which just as $As_2Se_3$ layer approximately 63 μm thick was formed on the aluminum substrate.

EXAMPLE 4

For comparison, a photosensitive material was prepared in the same manner as Example 1, except that the surface coating layer was composed of 4 atomic % arsenic with a thickness of approximately 2 mm.

The test results for the four photosensitive materials of Examples 1 through 4 are shown in Table 1, wherein o represents a good result, Δ represents some loss of quality and x an unacceptable result.

TABLE 1

| Photo-sensitive material | Layer constitution | Hardness (HV) | Spectral sensitivity (wavelength (780 nm) | Printing (Circumferential speed 780 mm/sec) | Overall estimation |
|---|---|---|---|---|---|
| Example 1 | Se/As-Se/Te-Se/As (38%) | 150 | o | Δ | Δ |
| Example 2 | Se/As/I-Se/Te-Se/As (38%) | 150 | o | o | o |
| Example 3 | Se/As | 150 | x | x | x |
| Example 4 | Se/As-Se/Te-Se/As (4%) | 60 | o | Δ | x |

As shown in Table 1, the photosensitive materials of Examples 1 and 2 according to the present invention and the photosensitive material of the comparative Example 4 has sufficient sensitivity at long wavelengths. The photosensitive materials of Examples 1 and 2 and the photosensitive material of the comparative Example 3 has high hardness and printing resistance. Furthermore, in the test using an actual printer of 100 msec from exposure to development corresponding to high speed response, the photosensitive materials of Examples 1 and 2 and the photosensitive material of Example 4 were satisfactory and they were particularly excellent with respect to the density contrast.

I claim:

[1. A photosensitive material for electrophotography, which comprises in sequence (a) an electroconductive substrate;

(b) a carrier transport layer composed of a selenium-arsenic alloy;

(c) a carrier generation layer composed of a selenium-tellurium alloy; and (d) a surface coating layer composed of selenium-arsenic alloy.]

[2. The photosensitive material according to claim 1, wherein the arsenic concentration in the carrier transport layer is from 5 to 40 atomic %.]

[3. The photosensitive material for electrophotography according to claim 2, wherein the carrier transport layer also contains from 100 to 10,000 ppm of iodine.]

[4. The photosensitive material of claim 1, wherein the tellurium concentration in the carrier generation layer is from 20 to 40 atomic %.]

[5. The photosensitive material according to claims 1, 2, 3 or 4, wherein the arsenic concentration in the surface coating layer is from 5 to 40 atopmic %.]

6. [The] *A* photosensitive material for electrophotography which comprises in sequence:

(a) an electroconductive substrate;

(b) a carrier transport layer composed of a selenium-arsenic [ally] *alloy* comprising [5] *30* to 40 atomic % arsenic;

(c) a carrier generation layer composed of a selenium-tellurium alloy comprising 20 to 40 atomic % tellurium; and (d) a surface coating layer composed of a selenium-arsenic alloy comprising [5 to] 40 atomic % arsenic, *wherein the composition of the selenium-arsenic alloy in the carrier transport layer prevents cracking of the surface coating layer due to differences in the heat expansion coefficients of the surface coating layer and the carrier generation layer.*

[7. The photosensitive material according to claim 6, wherein the carrier transport layer also contains from 100 to 10,000 ppm iodine.]

[8. The photosensitive material according to claim 1, wherein the concentration of arsenic in the carrier transport layer is at such a level to maintain crystallization resistance and high temperature stability.]

[9. The photosensitive material according to claim 8, wherein the concentration of tellurium in the carrier generation layer is not so high as to cause an increase in dark decay and promote crystallization of the layer.]

[10. The photosensitive material according to claim 9, wherein the concentration of arsenic in the surface coating layer is not so high as to decrease the hardness of the layer.]

* * * * *

UNITED STATES PATENT AND TRADEMARK OFFICE

CERTIFICATE OF CORRECTION

PATENT NO. : Re. 35,246

DATED : May 21, 1996

INVENTOR(S) : Mitsuru Narita

It is certified that error appears in the above-indentified patent and that said Letters Patent is hereby corrected as shown below:

Title page, Item 54 and Column 1, line 1, "LAYED PHOTOSENSITIVE MATERIAL AND" should read --LAYERED PHOTOSENSITIVE MATERIAL FOR--;

Column 2, line 55, "that" should read --than--;

Column 3, line 36, "($As_2Se_3$)" should read --$As_2Se_3$--;

Column 3, line 65, "just as" should read --just an--;

Column 4, line 14, above "Spectral" insert --[Printing]--;

Column 4, line 14, above "(Circum-" change "Printing" to --*Printing*--;

Column 4, line 33, "has" should read --had--;

Column 4, line 36, "has" should read --had--;

Column 5, line 5, delete "[ally] *alloy*" and replace with --alloy--.

Signed and Sealed this

Fifth Day of November, 1996

*Attest:*

*Attesting Officer*

Bruce Lehman

BRUCE LEHMAN

*Commissioner of Patents and Trademarks*